P. H. REARDON.
AIR COMPRESSOR.
APPLICATION FILED JAN. 17, 1912.
1,097,878.
Patented May 26, 1914.
4 SHEETS—SHEET 2.
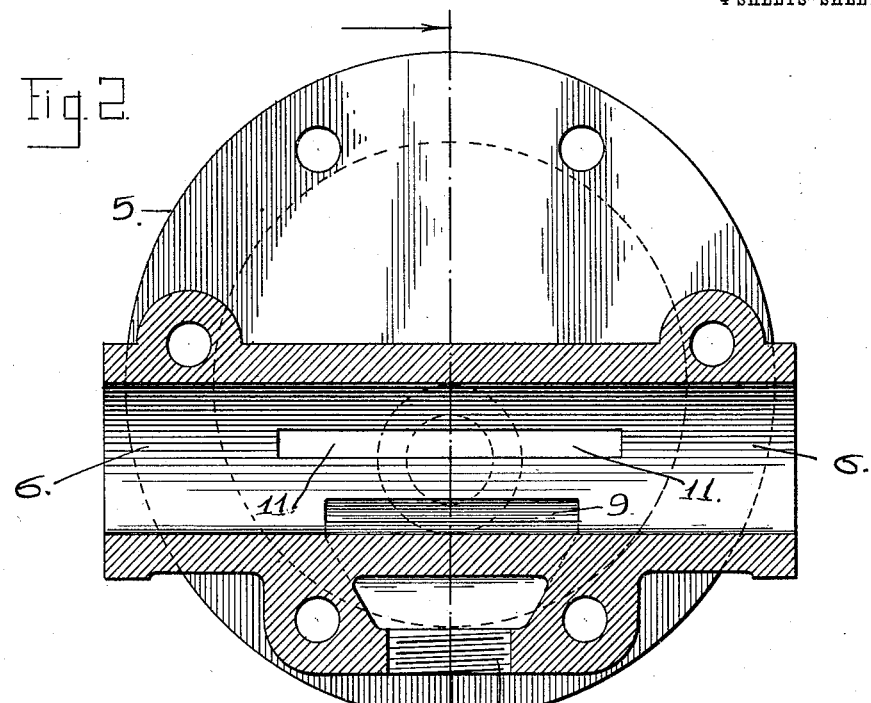
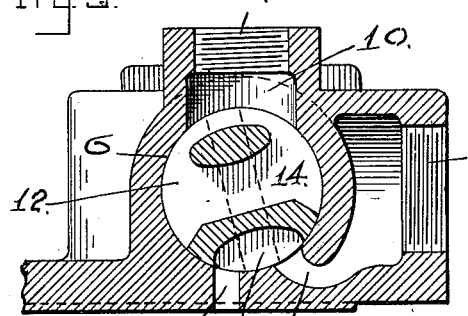
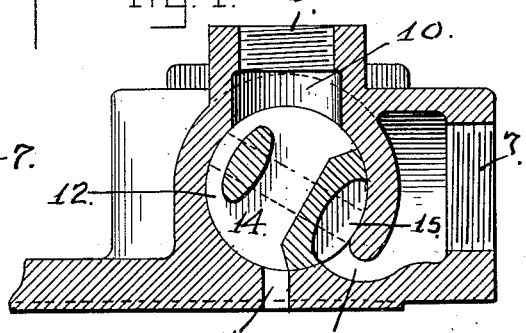
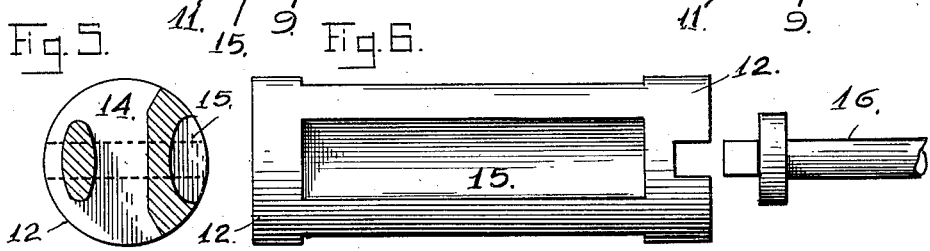

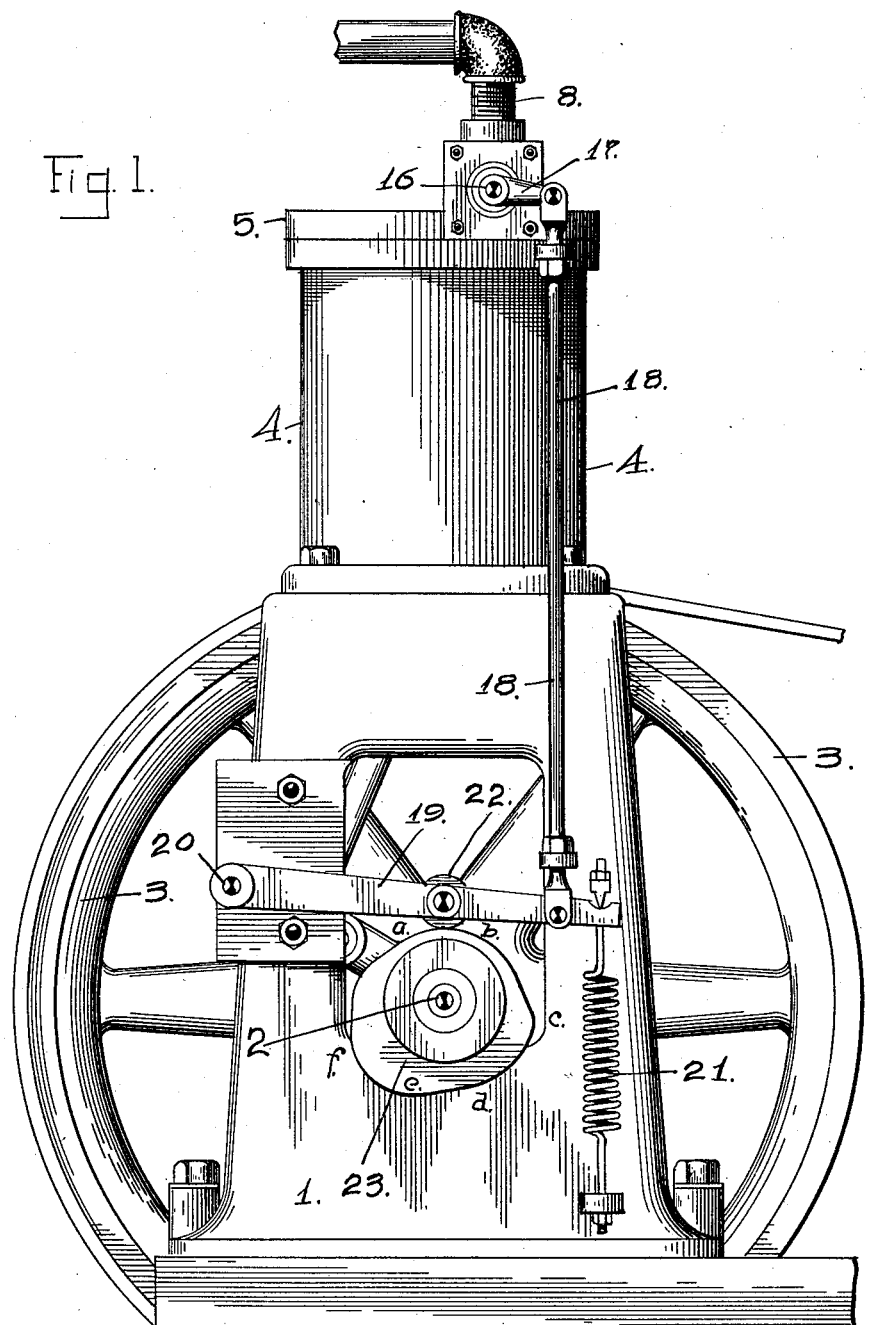

P. H. REARDON.
AIR COMPRESSOR.
APPLICATION FILED JAN. 17, 1912.
1,097,878.
Patented May 26, 1914.
4 SHEETS—SHEET 3.
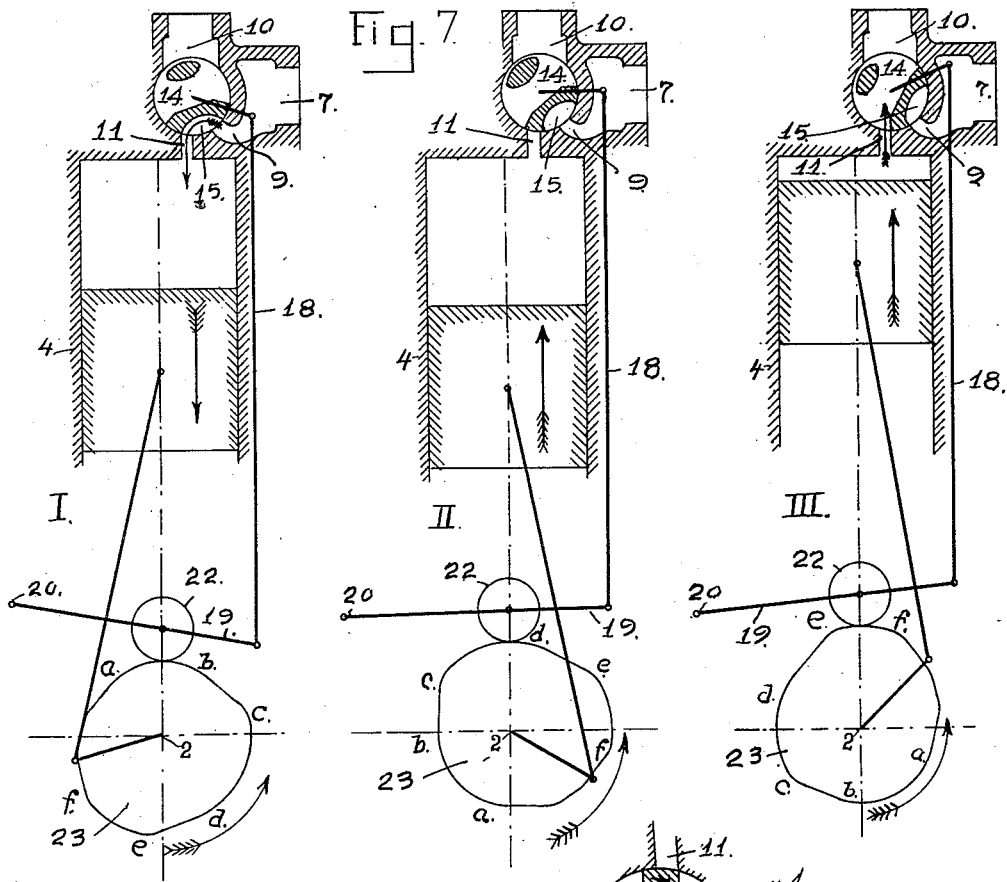
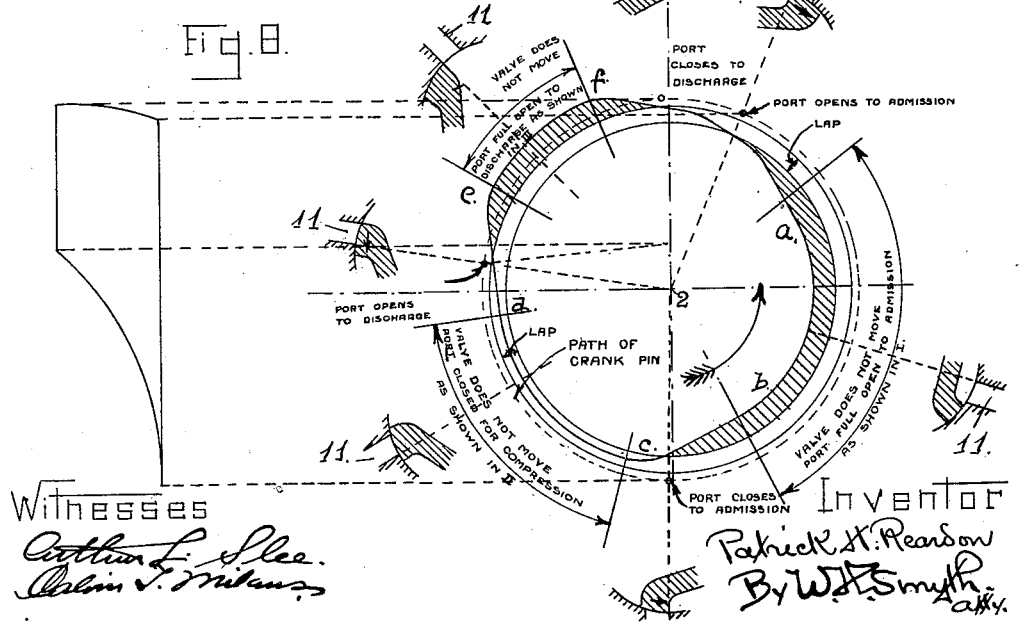

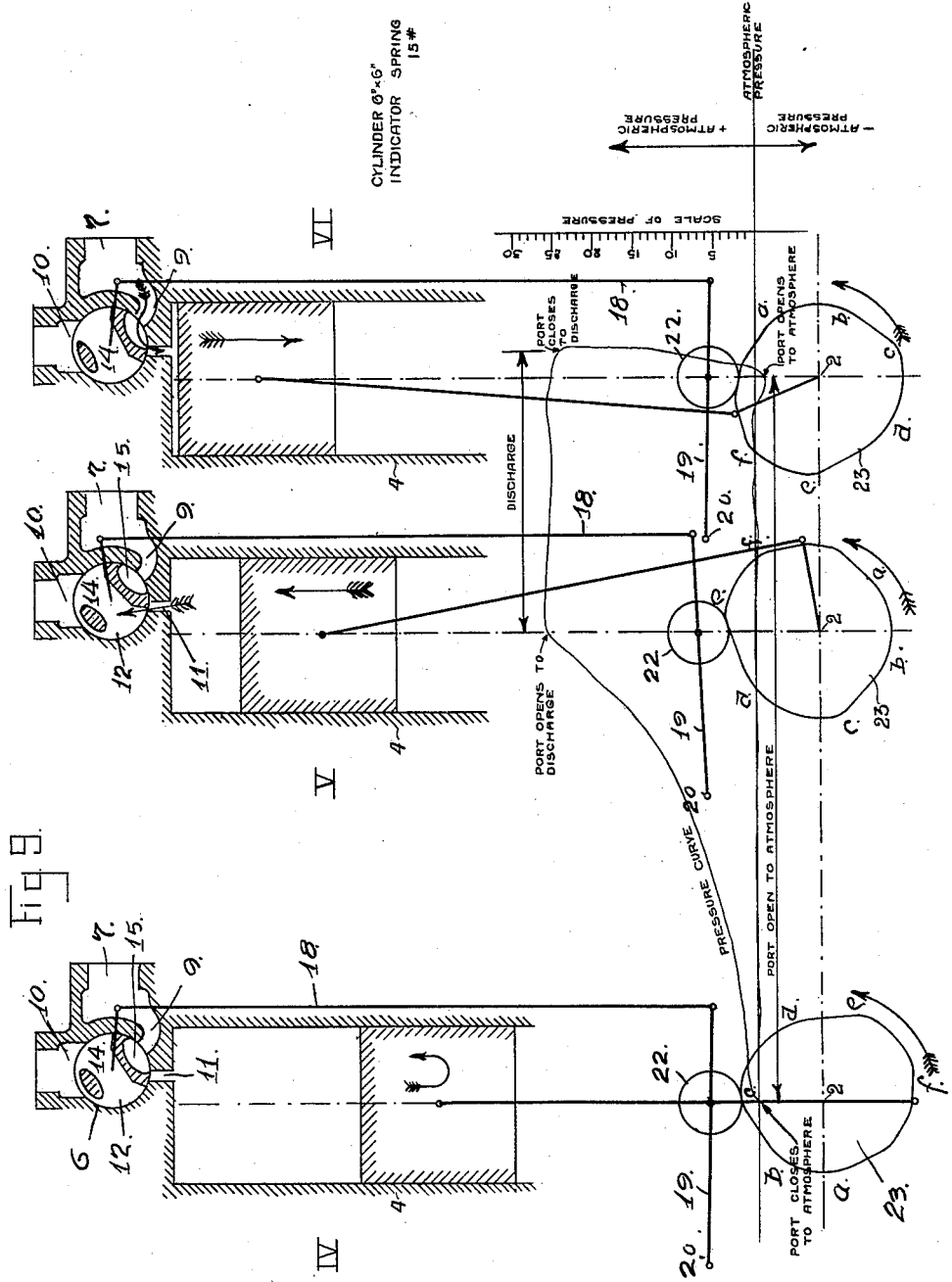

UNITED STATES PATENT OFFICE.

PATRICK H. REARDON, OF SAN FRANCISCO, CALIFORNIA.

AIR-COMPRESSOR.

1,097,878. Specification of Letters Patent. Patented May 26, 1914.

Continuation of application Serial No. 568,292, filed June 22, 1910. This application filed January 17, 1912. Serial No. 671,726.

*To all whom it may concern:*

Be it known that I, PATRICK H. REARDON, a citizen of the United States, residing at San Francisco, in the county of San Francisco and State of California, have invented certain new and useful Improvements in Air-Compressors, of which the following is a specification.

My invention relates to air compressors and has for its main object to extend their usefulness into fields in which, heretofore, they were unavailable.

The ordinary type of compressor, now in general use, employs puppet valves, controlled by springs. This results in certain undesirable effects. In the great majority of installations these effects are not seriously detrimental. They do, however, limit the employment of this type of device and exclude it from a large field of usefulness for which it is otherwise adapted.

So an object of the present invention, stated generally, is to provide a compressor which, while maintaining an equally high or producing a greater efficiency than those at present in use, avoids the undesirable effects referred to.

A puppet valve, owing to its inherent characteristics, is sudden in its opening, and non-positive in its action. The necessary presence of its spring makes it especially so in its closing; that is to say, it hammers and "flutters." Many attempts have been made to remedy its defects by various means, such as reducing the area of its seat, adjustment of the springs, and lightening its weight. These, however, are ineffective and particularly so when it is attempted to enlarge the effectiveness of a given compressor by increasing its speed.

This whole matter of compressor valves is beset by mechanical difficulties which confined to narrow limits, the possibility of variations in puppet valves, looking toward the elimination of their objectionable effects.

The hammering of the puppet valve upon its seat necessitates a large margin of safety and consequent weight of valve to insure a reasonable length of service and avoid, to the greatest possible extent, that ever present source of disaster in compressors, the fracture of a valve and the introduction of a fragment into the compressor cylinder.

Reduction in seat area shortens the life of a valve, and reducing the strength of the controlling spring enhances the undesirable fluttering of the valve, and renders it otherwise inefficient. Thus it comes about in compressors that even with the best proportions of valve and spring the puppet type of valve is violent in its action and exceedingly noisy.

The difference in the area of the in- and outside of a puppet valve requires that the pressure on the smaller area must be proportionally increased in order to open the valve against the lesser pressure on the opposite side. This results in a violent or popping action of the valve the instant contact of valve with its seat is broken, and the larger area of the valve surface exposed to the higher pressure beneath the valve. Then the peculiar characteristic of springs, that their resistance increases with their compression, adds another difficulty, which with the previously described effect, increases the hammering by rebound from spring. The result of all these factors is that the stream of air issuing from the outlet, under the steady pressure of the piston is in the form of pulsations brought about by the conflict between the popping opening, the momentum, and the inertia of the valve, and the necessarily varying resistance of its opposing spring. This undesirable pulsatory effect is sought to be remedied in ordinary compressors by the introduction of a large receiver in the pipe line, and this does minimize the effect of pulsations, but cannot eliminate it. Owing largely to these conditions, the indicator card taken from a compressor, differs characteristically from that taken from a steam engine, in that its lines are wavy through a wide range. However, aside from these undesirable effects which, as has already been intimated, do not materially affect the usefulness of compressors in a large majority of employments, the puppet valve, owing to its simplicity, reliability, ease of repair and of renewal, and its instantaneous action is exceptionally well adapted to compressor use, and hence it has firmly established itself in the compressor art, for the control of air to and from the compressor cylinder. Both of these characteristics of the ordinary compressor, its noise, and the pulsatory character of the outflowing current, exclude it largely from hotels, hospitals, and mechanical surgery, dentistry work, and the like. In the first two, possible utilities, it is unavailable, owing to the noise which is conveyed through the building by the pipes. And in the others, owing to the effect of the pulsations on the speed of the tools employed and on the nerves of the patients.

Another object of my invention, therefore, is, the solution of the problem, heretofore, unaccomplished, to provide a compressor of simple construction which will produce an indicator card free from the wavy lines characteristic of the ordinary compressor, by avoiding the pulsations in the outgoing stream of air which produce them. And another object is to provide, with the foregoing characteristics, a compressor noiseless in its operation. And a further object is to provide a compressor with the foregoing capabilities and which, in addition thereto, is inherently capable of being run at a speed higher than is practicable with puppet valves.

Mechanically operated valves are customarily slow and deliberate in their action compared to puppet valves. This renders them undesirable in compressors for the control of the outflow and intake of air.

For efficiency it is desirable that the passage for the outgoing compressed air and the passage for the incoming air shall be freely open to these oppositely traveling currents, to avoid "wire drawing" the air. And further, that the free opening from the cylinder to the pipe line shall not be closed till all the compressed air is forced out of the cylinder by the piston stroke, and the flow of free air to the cylinder shall be unobstructed. These desirable conditions which are in large measure filled by the puppet valves, apparently preclude the practical employment of any valve less sudden in operation. These difficulties have heretofore rendered practically insoluble the problem of substituting a noiseless valve for the noisy puppet. They also have precluded, heretofore, the employment of a single passage common to the discharge and intake of air from the compressor cylinder controlled by a valve operated by any form of cam. Employment of eccentrics to perform these cam functions is precluded by the inherent character of the motion produced thereby, it being uniform non-intermittent and sluggish and otherwise unadapted to meet the requirements of the rapid and speed-varying motions required at the end of the piston stroke to properly direct the currents of air to and from the cylinder, under compressor conditions.

The action of a piston, reciprocated by a crank and connecting rod, has certain peculiarities. One of these is that the motion of the piston, as the crank nears and passes the "dead" center, is exceedingly slow, passing as it does into and through the zero point of reciprocatory motion. Thus, for some distance, in the arc motion of the crank, passing the "dead centers" of motion, the piston performs infinitesimal and hence negligible effect. This peculiarity, as will be more fully explained, is, in my invention, taken advantage of to bring about the desired effects and avoid the undesirable results heretofore referred to. This is done by utilizing this rapid but heretofore substantially useless arc motion of the crank near the beginning of the intake stroke and transferring it into rapid speed-varying, intermittent and effective motion of a controlled valve through a suitable cam to perform the rapid opening and closing of the intake and discharge passages near the end of the stroke, and thus permit a single-valve controlled single-passage to be utilized as a common passage from the cylinder to the discharge pipe and to the atmosphere. And thus are removed many difficulties of the problem which it is the object of the present invention to accomplish.

The compressor herein illustrated accomplishes all of the objects sought and overcomes the difficulties set forth and heretofore deemed insuperable. The accomplishment of the stated objects and the solution of the problems involved are effected by means of the devices which I shall hereinafter fully describe by reference to the accompanying drawings, in which:—

Figure 1 is an elevation of my compressor as seen from the cam end. Fig. 2 is a plan, enlarged, of the cylinder head, its valve seat being in horizontal section. Fig. 3 is a cross section through the valve seat and valve, the latter being shown in position to open inlet and close the outlet. Fig. 4 is a similar cross section showing the valve in position to open the outlet and close the inlet. Fig. 5 is a cross section of valve. Fig. 6 is an elevation of the valve and its stem. Fig. 7 is a diagrammatic view showing the compressor cycle by three positions of full functional operation, (numbered—I., II., III.) I.—taking free air; II.—compressing air; III.—discharging compressed air. Fig. 8 is an illustrative diagram of the cam which operates the valve, and its relation to all of the functional positions of the valve, and also its relation to a theoretically correct indicator card. Fig. 9 is a substantially similar diagram to Fig. 7, but showing the cycle by the three positions at the beginning of the three functional operations (numbered—IV., V., VI); IV., beginning compression; V., beginning the discharge of the compressed air; VI., beginning the intake of a fresh volume of free air from the atmosphere into the cylinder. And superimposed upon and connecting these diagrammatic positions is an indicator card exactly reproduced from one taken from one of my compressors in commercial operation, said card clearly indicates the functional operations and their relations to the positions of the various operative parts of the compressor.

1. is a base in which is mounted the crank shaft 2., driven by power applied to the wheel 3.

4. is the cylinder bolted on the base, said cylinder containing the usual piston, which piston is driven by suitable connecting-rod from the crank 2.

5. is the cylinder-head. This head is formed or provided with a valve-seat 6, near its top; and said seat has an inlet connection 7. and an outlet connection or discharge conduit 8. The inlet connection 7. communicates with the valve-chamber through a port 9; and the outlet connection 8. communicates with said chamber through a port 10. The valve-chamber communicates with the interior of the cylinder 4. through a port 11. leading from the chamber through the head 5.

12. is the valve. It fits and is adapted to move on the seat 6. The valve 12. has an outlet passage 14., and an inlet passage 15., the latter having a width sufficient to span, and connect the inlet port 9 of the valve seat with the cylinder port 11. When the valve is in a position in which the connection of said ports 9. and 11. is effected by the inlet passage 15., as in Fig. 3., air will be taken into the cylinder through inlet connection 7., inlet port 9., passage 15., and port 11. At this time the through passage 14. of the valve is cut off from the cylinder port 11. so that the outlet connection is closed to the cylinder. But upon a further movement of the valve, the inlet passage 15. is carried over to bridge and close the inlet port 9., and to open the cylinder port 11., to the through valve-passage 14., as shown in Fig. 4., thereby connecting said port with the outlet port 10., and outlet connection 8., so that the air will pass out from the cylinder through port 11., passage 14., port 10. and connection 8. Thus a single valve, with a relatively short movement, is made to control both the intake and outlet of the compressor, and said valve, is practically noiseless in its operation.

To operate the valve in a manner conducive to silence and consistent with the requirements and best efficiency of the compressor with respect to the admission, compression and discharge of the air, I prefer to use a free cam connection. This cam connection I show in Fig. 1.

16. is the valve stem having secured to it an arm 17. With this arm is connected a rod 18., the lower end of which is connected with a lever 19. pivoted at one end at 20., and controlled by a spring 21. at the other end. On this lever is carried a contact roller 22. Upon the crank shaft 2. is shown a cam 23. or irregular outline which, by impingement on the roller 22. timely operates the valve 12. through the connection described.

In order to more fully appreciate the interaction of the crank connecting-rod, connections and the novel functions and effects thereby produced, reference may be had to Figs. 7., 8. and 9. In position I of Fig. 7. the piston and crank are about half way on their down stroke and the passages 9., 11. and 15. are full open for the inlet of air. In II. the crank and piston have completed their down stroke and are well started on the up- or compression-stroke with the port or passage 11. closed by valve 15. In III. the crank has advanced on the up-stroke and the piston has passed the point on its compression stroke at which the pressure in the cylinder equals that in the discharge pipe so the passage II. is fully open from the cylinder to the discharge and the piston is forcing the compressed air out of the cylinder into the outlet connection on discharge conduit 8.

Referring to Fig. 7. in more detail:—In I. the valve is indicated in the position shown in Fig. 3., and the cam is presenting its circular arc of holding low-surface from $a$ to $b$, a position which is also shown in Fig. 1. The relation of parts in I. is the position for the admission of air to the cylinder, and it will be seen that by reason of the preceding descending or irregular functional surface of the cam from $f$ to $a$, leading down to the circular arc $a$ to $b$, the valve which has been turned from the position shown in II. is that shown in I. which is wide-open, is now being held wide-open to the admission of air throughout the greater portion of the down or intake stroke of the piston. This wide or full opening of the intake at substantially the beginning of the effective stroke, that is, at the time when it has increased to its highest speed, and its maintenance throughout the stroke is important in preventing "wire-drawing" of the air, as would occur through a continuous lazy or gradual opening of the intake, which would be the result if gears or an eccentric were employed to operate the valve. In II. the piston is returning on its compression stroke. At the beginning of this return stroke, the cam having by the ascending or irregular functional surface from $b$ to $c$ turned the valve to entirely close the cylinder, is now presenting its continuing circular arc of higher surface from $c$ to $d$ with the effect of holding the valve so closed, and this condition prevails until the piston is near the limit of its return stroke and the air in the cylinder is compressed to the pressure in the reservoir, whereupon the cam presents its final or highest ascending or irregular functional surface from $d$ to $e$ with the effect of turning the valve to open the cylinder to the discharge, as shown in III., and during the remainder of said stroke the valve is so held open by the relatively short succeeding circular arc of highest surface from *e* to *f*, as seen in said III. This is also the position shown in Fig. 4. This last position is relatively short in point of time, for the cam, beginning another cycle, returns the valve to its admission relation shown in Figs. 3. and I. of Fig. 7.

In Fig. 8. is shown and described the relations which the crank and the various contours of the cam and its motions bear to the positions, motions and stationary periods of valve 15. In this figure, as in the other views, the arrows indicate location, position or length of travel. In this view is indicated all the functional operations of the crank, cam and valve, and likewise, by mechanical inference, those of the piston also. Those of the piston and cylinder are clearly pointed out by the theoretical indicator diagram shown to one side of the cam and connected thereto by dotted lines.

In position IV. of Fig. 9. the crank is on the lower "dead" center of motion, the piston is at the lower limit of travel, just beginning its up or compression stroke with passage 11. closed. In V. the crank and piston are at the point in their upward travel, at which the compression of air in the cylinder equals the desired pressure at which the compressor is designed to deliver air. Thus the port 11. is just opening to begin discharging air. In VI. the crank and piston have passed some distance beyond the upper "dead" center of motion, on the down stroke, to a point at which the passage 11. begins to open to free air. During this period of slow and negligible piston motion and effect the normal rapid crank arc motion is transferred by the cam and its connections to the valve 12. to pass it rapidly across the passage 11. The indicator diagram, superimposed on this view, unifies the functions and effects occurring at and between the positions IV., V. and VI., and presents them visually still more clearly. This diagram or "card" taken from one of these machines at work in commercial operation constitutes, to those skilled in the art, the best form of information on the cycle of operations of this compressor,—to which further verbal description in this connection would add little or nothing of value. Attention, however, may be called to the depression in the diagram or "card" below atmosphere. This indicates that in the particular compressor from which the card was taken or under the particular conditions of its operation,—the opening of the passage to atmosphere might with benefit have been a trifle earlier. Or the same effect would be produced by slightly increasing the area of the passage 11. The deviation from the theoretical card is, however, so slight as to be practically negligible. Thus the valve is operated under and consistently with conditions of highest compressor efficiency, and by reason of its own nature and the consequent simplification, by the use of but one valve, for the air control, and by reason of the character of the valve and the nature of the cam connection, the operation of the compressor is noiseless. And further, the speed is not limited, as with puppet valve compressors,—by the nature of the air controlling valve.

There is thus produced an efficient, noiseless, high speed, single-valve compressor of very simple construction. As these highly desirable and novel functions, effects, and results, combined, produce a new type of compressor, I do not desire to confine myself to the form or proportion of the parts or details of construction, herein shown to illustrate my invention, but

What I claim is:—

1. In an air-compressor, the combination of a single valve adapted to control both the admission and the discharge of air, an irregular-outline cam fashioned to permit the valve to remain stationary in the successive positions required for the pumping operation, and to quickly change its positions, and operative connection from the cam to the valve.

2. In an air-compressor and in combination with its compressing cylinder and operating shaft, a single valve adapted to control both the inlet and outlet connections of the cylinder, an irregular-outline cam on the shaft fashioned to permit the valve to remain stationary in the successive positions required for the pumping operation, and to quickly change its positions, and operative connection from the cam to the valve.

3. In an air-compressor and in combination with its compressing cylinder and operating shaft, a single valve adapted to control both the inlet and outlet connections of the cylinder, an irregular-outline cam on the shaft fashioned to permit the valve to remain stationary in the successive positions required for the pumping operation, and to quickly change its positions, and connections from the cam to operate the valve comprising a pivoted, spring-controlled lever carrying a roller impinging on the periphery of the cam, an arm on the valve and a rod connecting the lever and arm.

4. In an air-compressor the combination of a single valve adapted to control both the admission and discharge of air, an irregular-outline cam and connections therefrom to operate said valve, said cam being fashioned to throw the valve closed to the discharge and full open to the admission at the effective beginning of the intake stroke and hold it thus during said stroke, to close the valve to both the discharge and the admission at the beginning of the compression stroke and hold it thus throughout the greater part of said stroke, and to open it, near the end of said compression stroke, to the discharge, and hold it thus to the beginning of the admission stroke.

5. In an air-compressor, the combination of a single valve adapted to control both the admission and discharge of the air, a rotating irregular-outline cam having a low functional surface, a higher functional surface and a highest functional surface in the order named, and connections from said cam to said valve so disposed relatively to both that the low surface of the cam effects the closing of the valve to the discharge and its full opening to the admission at the effective beginning of the intake stroke, and holds it thus during said stroke, and the higher surface of said cam effects the closing of the valve to both the discharge and the admission at the beginning of the compression stroke and holds it thus throughout the greater portion of said stroke, and the highest surface of said cam effects near the end of said compression stroke the opening the valve to the discharge and holds it thus to the beginning of the admission stroke.

6. In an air-compressor and in combination with its compressing cylinder and operating shaft, a valve adapted to control both the admission and discharge of the air to and from the cylinder, an irregular-outline cam on the shaft having a low functional surface, a higher functional surface, and a highest functional surface in the order named, and connections from said cam to said valve so disposed relatively to both that the low surface of the cam effects the closing of the valve to the discharge and its full opening to the admission at the effective beginning of the intake stroke and holds it thus during said stroke, and the higher surface of said cam effects the closing of the valve to both the discharge and the admission at the beginning of the compression stroke, and holds it thus throughout the greater portion of said stroke, and the highest surface of said cam effects nears the end of said compression stroke the opening of the valve to the discharge and holds it thus to the beginning of the admission stroke.

7. In an air-compressor, the combination of a single valve adapted to control the admission and discharge of the air, power connections to operate the compressor and cam connections therewith fashioned to permit the valve to remain stationary in the successive positions required for the pumping operation and to quickly change its positions to give intermittent motion to the valve.

8. An air-compressor comprising a cylinder, a piston therein, a crank shaft and a connecting-rod to operate the piston, a port in the cylinder communicating with suitable intake and discharge passages, a single-valve controlling these passages and directing the flow of fluid therethrough, means connected with and operated by the shaft adapted to permit the valve to remain stationary in the successive positions required for the pumping operation and to transmit varying speed thereto.

In testimony whereof I have signed my name to this specification in the presence of two subscribing witnesses.

PATRICK H. REARDON.

Witnesses:
ELDRIDGE E. GREEN,
JOS. A. BERCKLEY.

---

Copies of this patent may be obtained for five cents each, by addressing the "Commissioner of Patents, Washington, D. C."